United States Patent
Bulleit et al.

(10) Patent No.: US 10,803,470 B2
(45) Date of Patent: Oct. 13, 2020

(54) METHODS AND DEVICES FOR PROVIDING SPONSORED PROACTIVE SEARCHES FOR SPONSORED QUALITY OF SERVICE NETWORK CONNECTIONS

(75) Inventors: Douglas A. Bulleit, Atlanta, GA (US); Stanley K. Yeatts, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1932 days.

(21) Appl. No.: 13/570,420

(22) Filed: Aug. 9, 2012

(65) Prior Publication Data
US 2012/0304045 A1      Nov. 29, 2012

Related U.S. Application Data

(63) Continuation of application No. 10/858,366, filed on Jun. 1, 2004, now Pat. No. 8,280,774.

(60) Provisional application No. 60/562,680, filed on Apr. 15, 2004.

(51) Int. Cl.
*G06Q 30/02*          (2012.01)
*G06F 16/9535*     (2019.01)

(52) U.S. Cl.
CPC ......... *G06Q 30/02* (2013.01); *G06F 16/9535* (2019.01)

(58) Field of Classification Search
CPC ..................................................... G06Q 30/02
USPC .......................................................... 705/14
See application file for complete search history.

(56) References Cited

U.S. PATENT DOCUMENTS

| | | | |
|---|---|---|---|
| 5,774,869 A | 6/1998 | Toader | |
| 5,794,210 A | 8/1998 | Goldhaber et al. | |
| 6,366,298 B1 | 4/2002 | Kaitsuka et al. | |
| 6,442,529 B1 | 8/2002 | Krishan et al. | |
| 6,463,468 B1 | 10/2002 | Buch et al. | |
| 6,983,311 B1 | 1/2006 | Haitsuka et al. | |
| 2001/0044845 A1* | 11/2001 | Cloonan et al. | 709/226 |
| 2002/0103879 A1* | 8/2002 | Mondragon | 709/218 |
| 2003/0080995 A1* | 5/2003 | Tenenbaum et al. | 345/738 |

* cited by examiner

*Primary Examiner* — Sam Refai
*Assistant Examiner* — Rashida R Shorter
(74) *Attorney, Agent, or Firm* — Myers Bigel, P.A.

(57) ABSTRACT

A user can select a higher Quality of Service network connection that is at least partially subsidized by a sponsor. In response, an indicia of the sponsorship of the higher Quality of Service connection is provided to the user. The indicia of sponsorship can be provided as a result of a sponsored proactive search, wherein advertising and/or sponsored links may be repeatedly or continuously provided to the user based on analysis of the user's navigation of the network while using the higher Quality of Service connection. A sponsorship message (analogous to a "brought to you by" message in conventional radio or television programming) and/or a sponsored link also may be provided. Accordingly, higher Quality of Service network connections may be at least partially sponsored by third parties to provide revenue to the network provider that can at least partially subsidize the higher Quality of Service network connection.

19 Claims, 16 Drawing Sheets

METHODS AND DEVICES FOR PROVIDING SPONSORED PROACTIVE SEARCHES FOR SPONSORED QUALITY OF SERVICE NETWORK CONNECTIONS

CROSS-REFERENCE TO RELATED APPLICATIONS

This application is a continuation of application Ser. No. 10/858,366, filed Jun. 1, 2004, now U.S. Pat. No. 8,280,774 entitled Systems, Methods and Computer Program Products for Providing Sponsored Proactive Searches for Sponsored Quality of Service Network Connections, which itself claims the benefit of and priority from provisional Application No. 60/562,680, filed Apr. 15, 2004, entitled Systems, Methods and Computer Program Products for Providing Sponsored Proactive Searches for Sponsored Quality of Service Network Connections, assigned to the assignee of the present application, the disclosures of both of which are hereby incorporated herein by reference in their entirety as if set forth fully herein.

FIELD OF THE INVENTION

This invention relates to communications networks, and more particularly to managing Quality of Service (QoS) in communications networks.

BACKGROUND OF THE INVENTION

Communications networks are widely used for nationwide and worldwide communication of voice, multimedia and/or data. As used herein, communications networks include public communications networks, such as the Public Switched Telephone Network (PSTN), terrestrial and/or satellite cellular networks and/or the Internet.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. Specifically, Web browsers and software applications send a request over the WWW to a server, requesting a Web page identified by a Uniform Resource Locator (URL), which notes both the server where the Web page resides and the file or files on that server which make up the Web page. The server then sends a copy of the requested file(s) to the Web browser, which in turn displays the Web page to the user. The topology of the WWW can be described as a network of networks, with providers of network services called Network Service Providers, or NSPs. Servers that provide application-layer services may be referred to as Application Service Providers (ASPs). Sometimes a single service provider provides both functions.

In recent years, broadband access technologies, such as Digital Subscriber Line (DSL), cable modems, Asynchronous Transfer Mode (ATM), and frame relay have facilitated the communication of voice, video and data over the Internet and other public and private networks. Because broadband technologies are typically deployed by a single transport service provider, like a Regional Bell Operating Company (RBOC), their Regional Access Networks (RAN) are often shared by many NSPs and ASPs offering services that range from Internet access and VPN access to Voice over IP (also referred to as Voice Over Network (VON)), Video on Demand, and/or Gaming.

Moreover, broadband access technology has allowed service providers to expand their content and service offerings to both business and home users. For example, a user may subscribe to multiple services or applications, such as voice service, Internet access service, a video service, a gaming service, etc. from one or more service providers. These services and/or applications may be delivered over a single network connection, such as a DSL line.

Search engines often are utilized to facilitate searching the Web. Exemplary search engines include the Google™ search engine, and the MSN Search feature of the Microsoft Internet Explorer browser. As is well known to those having skill in the art, a search engine conventionally provides a search window in which key words can be entered by a user. In response, a listing of Web pages is provided that contain the search terms. Many search engines also provide sponsored sites in response to a search query. Sponsored sites, also referred to as sponsored links, are Web page links that are paid for by a third party, and are provided to the search engine by that third party. Sponsored sites or sponsored links are often provided in a column at the right hand side of the browser user interface, and can provide revenue opportunities for the search engine company and an enhanced searching environment for the user.

SUMMARY OF THE INVENTION

Some embodiments of the present invention allow a user to select a higher Quality of Service network connection than a standard Quality of Service network connection, wherein the higher Quality of Service network connection is at least partially subsidized by a sponsor. In response to user selection of the higher Quality of Service network connection, an indicia of the sponsorship of the higher Quality of Service connection is provided to the user. In some embodiments, the indicia of sponsorship of the higher Quality of Service connection can be provided as a result of a sponsored proactive search, wherein advertising and/or sponsored links may be repeatedly or continuously provided to the user based on analysis of the user's navigation of the World Wide Web while using the higher Quality of Service connection. In other embodiments, a sponsorship message (analogous to a "brought to you by" message in conventional radio or television programming) and/or a sponsored link may be provided in response to initial selection of the higher Quality of Service network connection. Accordingly, higher Quality of Service network connections may be at least partially sponsored by third parties to provide revenue to the network provider that can at least partially subsidize the higher Quality of Service network connection.

In some embodiments, the indicia of sponsorship may be provided upon user selection of an "on-demand broadband" network connection. Upon user selection of on-demand broadband, a sponsored proactive search, a sponsorship message, a sponsorship link and/or other indicia of sponsorship of the on-demand broadband connection may be provided.

It will be understood by those having skill in the art that embodiments of the invention have been described above primarily with respect to method aspects. However, other embodiments of the present invention provide analogous systems, computer program products, client devices, server devices and/or browser interfaces.

DETAILED DESCRIPTION

Figure 1:
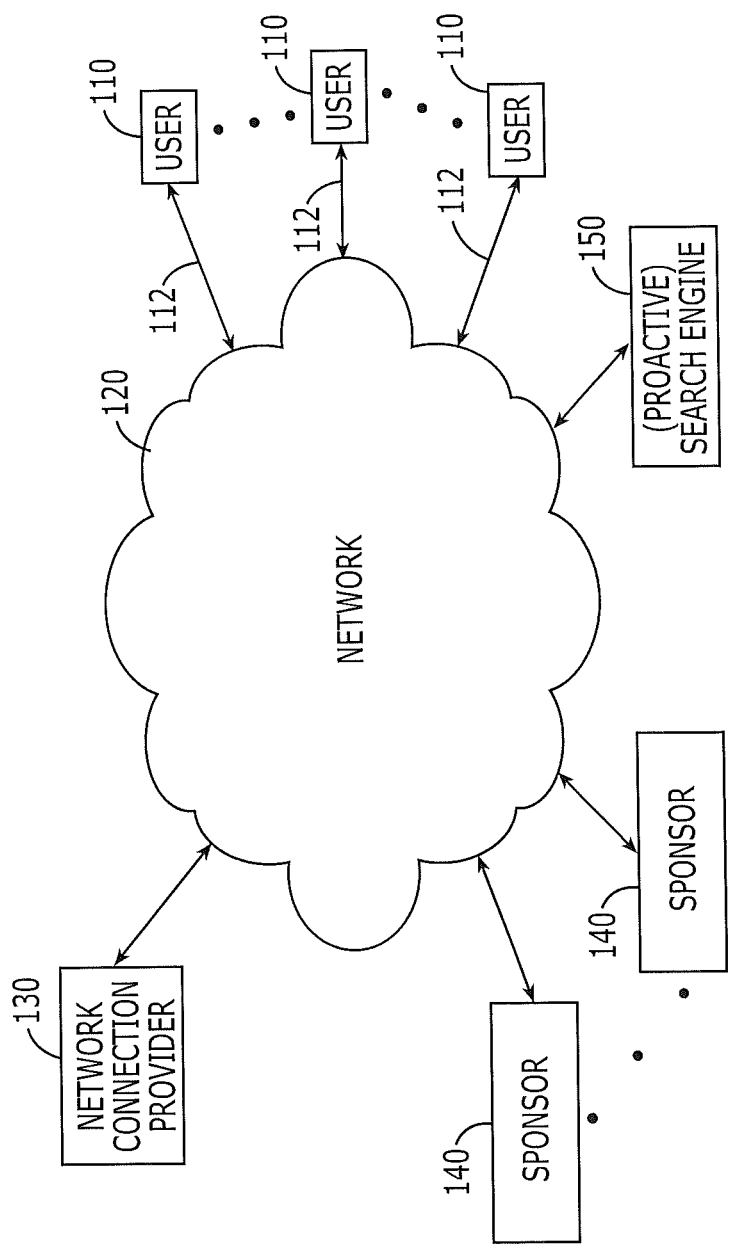
FIG. 1 is a block diagram of systems, methods and/or computer program products according to embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

It will be understood that the present invention is not limited to a particular network connection technology. Indeed, communication technologies and/or network configurations, such as, but not limited to, Digital Subscriber Line (DSL), Asynchronous Transfer Mode (ATM), frame relay, Hybrid Fiber Coax (HFC), wireless broadband, and/or Ethernet may also be used in some embodiments of the present invention. In general, the present invention is not limited to any communication technology and/or network configuration, but is intended to encompass any technology and/or network configuration capable of carrying out operations described herein. Embodiments of the present invention are also described herein in the context of managing Quality of Service (QoS). As used herein, Quality of Service includes, but is not limited to, treatment applied to a network connection, access session, application flow, and/or packet with respect to scheduling a resource, bandwidth allocation, and/or other indicia of quality in an individual element or across an end-to-end network.

FIG. 1 is a block diagram of various embodiments of the present invention. As shown in FIG. 1, a plurality of user devices 110, such as Web clients or browsers, are connected to a network 120 via a network connection 112, for communication therewith. The network 120 can be a public wired and/or wireless network, including the World Wide Web and can also include private and/or virtual private local and/or wide area networks. It will be understood that each of the user devices 110 may be embodied as one or more enterprise, application, personal, pervasive and/or embedded computer devices that may themselves be interconnected by one or more public and/or private, wired and/or wireless local and/or wide area networks, including the Internet.

A network connection provider device 130 may be used by a network connection provider to govern, among other things, the Quality of Service of the network connections 112 of the user devices 110. The network connection provider device 130 may be a standalone server and/or may be embodied in one or more enterprise, application, personal, pervasive and/or embedded computing devices that may themselves be interconnected by one or more public and/or private, wired and/or wireless local and/or wide area networks, including the Internet. Moreover, the network connection provider device 130 may be included at least partially within and/or distributed throughout the network 120. A network provider may include a Regional Bell Operating Company (RBOC), a wireless network provider, a network service provider and/or an application service provider.

One or more sponsor servers 140 also may be provided that can provide sponsor indicia, such as a sponsored links, sponsored messages or other sponsor indicia, as will be described in detail below. It will be understood that each of the sponsor servers 140 may be embodied as one or more enterprise, application, personal, pervasive and/or embedded computing devices that may themselves be interconnected by one or more public and/or private, wired and/or wireless local and/or wide area networks, including the Internet.

Finally, a search engine, and in some embodiments a proactive search engine, 150, is provided. Search engines are well known to those having skill in the art, and designate a Web client that can search for Web pages that contain key words. A conventional search engine searches for Web pages that include key words in response to user searches that are entered into a search window in a browser user interface. As used herein, a "proactive search engine" is a search engine that repeatedly and/or continuously searches for relevant Websites, including sponsored links or sites, as a user navigates various Websites, independent of or in addition to, when the user enters key words in a search window of a browser user interface. The search engine 150 may be embodied as one or more enterprise, application, personal, pervasive and/or embedded computing devices that may themselves be interconnected by one or more public and/or private, wired and/or wireless local and/or wide area networks, including the Internet. Multiple search engines 150 also may be provided.

FIGS. 2-8 are flowcharts of operations that may be provided according to various embodiments of the present invention. These operations may be provided by the network connection provider device 130 in combination with the user devices 110, the sponsor devices 140 and the search engine (s) 150, according to various embodiments of the present invention.

Figure 2:
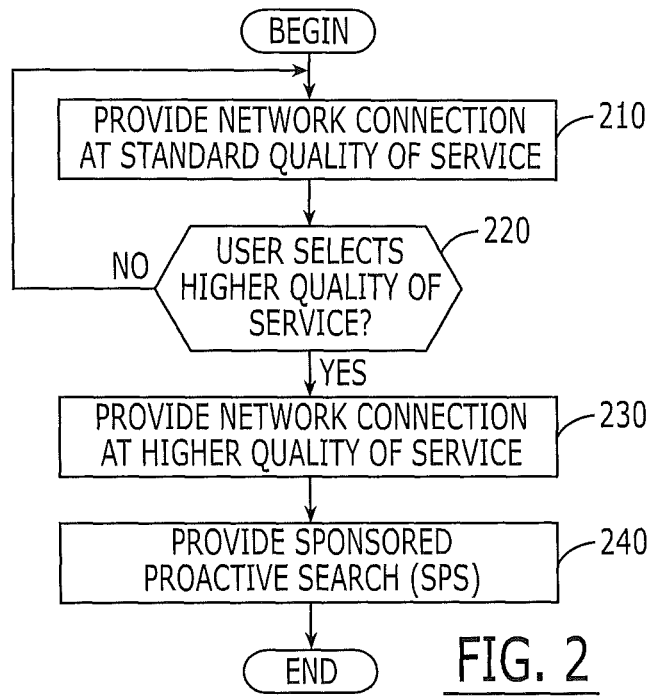
FIGS. 2-8 are flowcharts of operations that may be provided according to various embodiments of the present invention.

Referring now to FIG. 2, at Block 210, in some embodiments, a network connection 112 is provided for user devices 110 at a standard Quality of Service by a network connection provider 130 and a network 120. The standard Quality of Service may be, for example, 56 kbs broadband, although in other embodiments the standard Quality of Service may be, for example, a dial-up connection. At Block 220, the user selects a higher speed Quality of Service, such as a higher speed on-demand broadband connection. In response, at Block 230, a network connection is provided at the higher Quality of Service. A sponsored proactive search is provided at Block 240, while the network connection at the higher Quality of Service is operational. As used herein, a "sponsored proactive search" is a search that repeatedly and/or continuously searches for relevant sponsored links or sites, as a user navigates various Websites, independent of or in addition to when the user enters key words in a search window of a browser user interface. In providing the sponsored proactive search, a search engine 150 can continuously and/or at repeated intervals, provide listings of sponsored links, sponsored advertisements and/or other sponsored content, while the user is navigating the World Wide Web using the higher Quality of Service network connection. Revenues that are obtained by the network connection provider 130 from the sponsored proactive search at Block 240 can underwrite at least part of the cost of providing the network connection 112 at the higher Quality of Service. It will be understood that the user may be provided with a message or other indication at Block 220, that additional sponsored links or other sponsored proactive search features may be provided in consideration of the higher Quality of Service network connection that is being provided.

Figure 3:
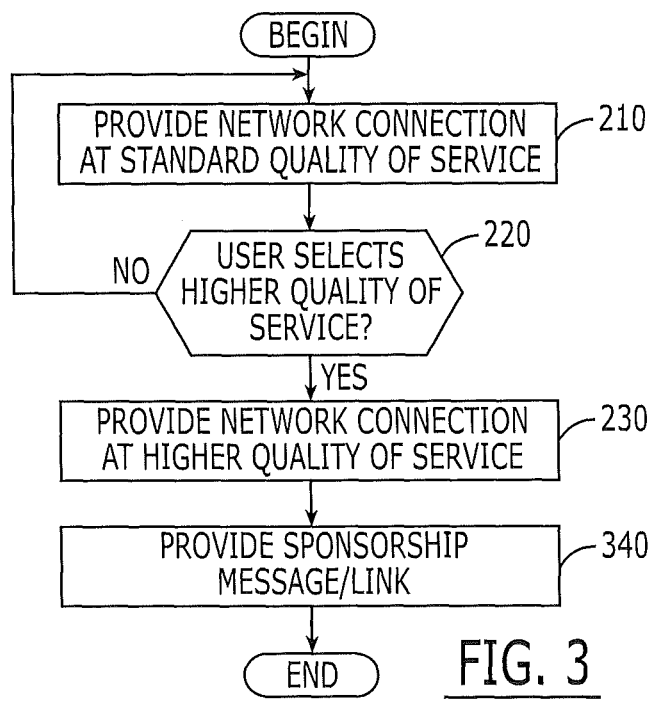

FIG. 3 is a flowchart of other embodiments of the present invention. In FIG. 3, operations of Blocks 210, 220 and 230 proceed as was described above. However, at Block 340, a sponsorship message or a sponsorship link may be provided upon initially providing the network connection at higher Quality of Service (Block 230). For example, a message may be provided that indicates that the "higher Quality of Service network connection is brought to you by . . . ", where the sponsor is identified. A link to the sponsor also may be provided at this time.

Figure 4:
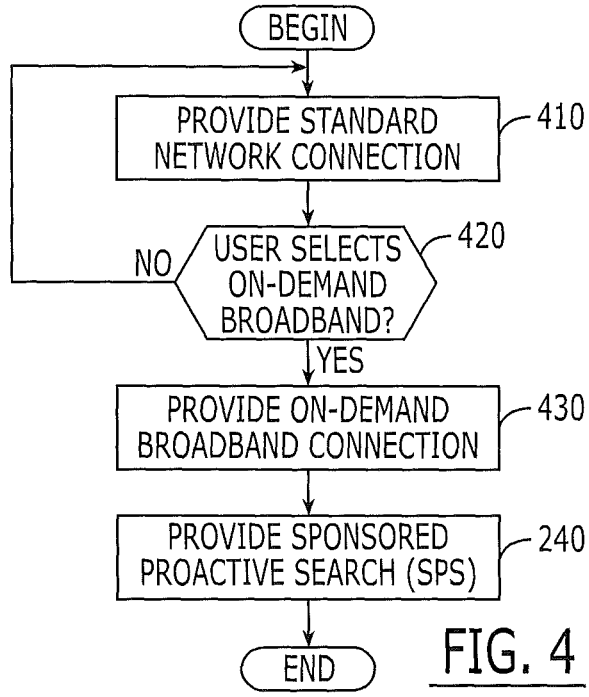
Figure 5:
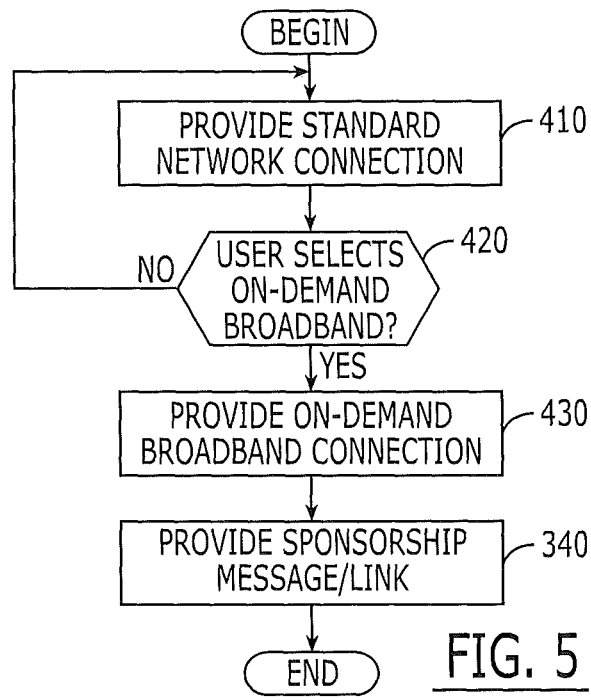
Figure 9:
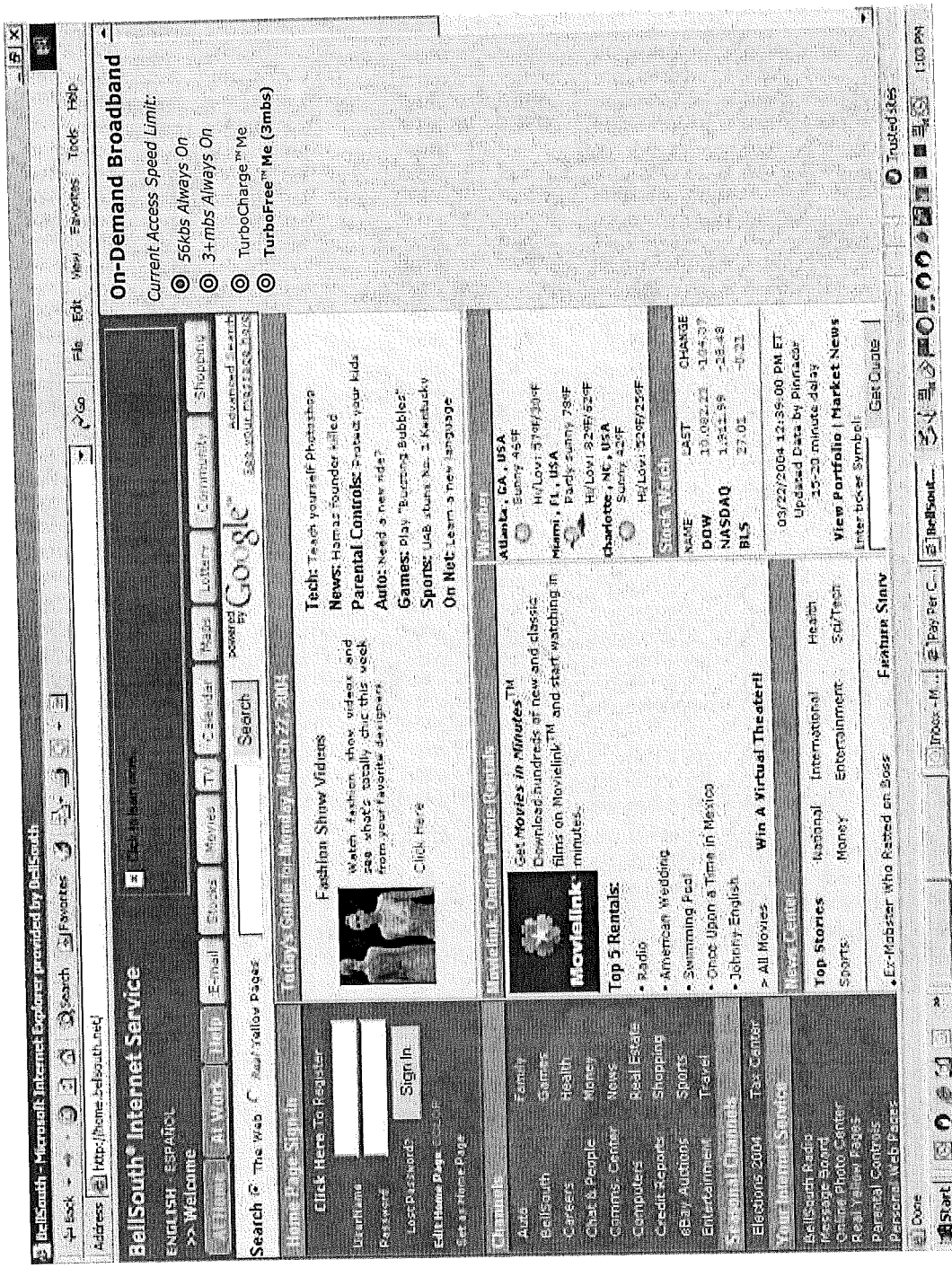
FIGS. 9-20 are user interfaces that may be provided according to various embodiments of the present invention.
Figure 10:
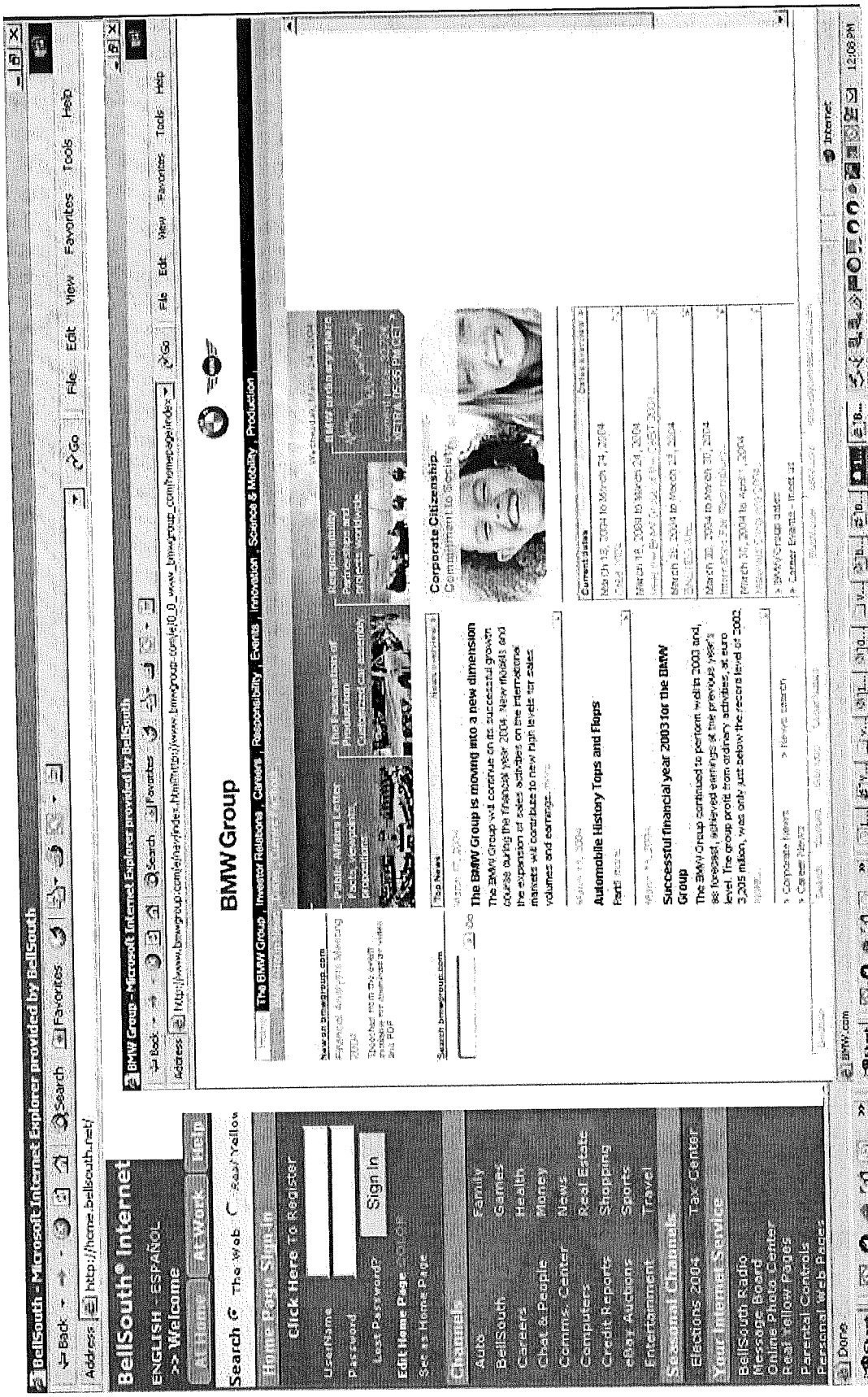
Figure 11:
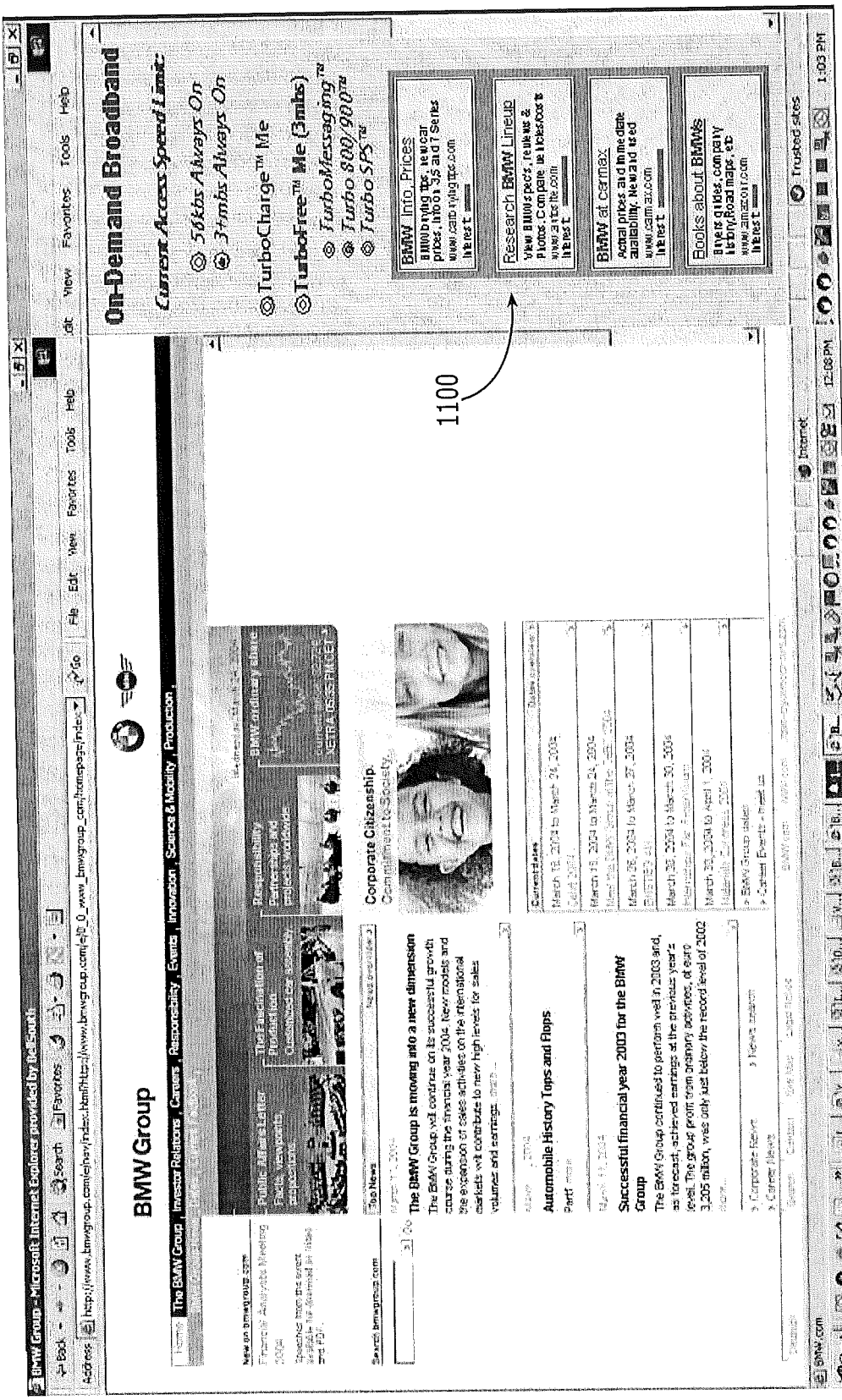

FIGS. 4 and 5 are flowcharts of operations according to other embodiments of the present invention, to illustrate on-demand broadband embodiments of the present invention. As shown at FIG. 4, a standard network connection may be provided at Block 410, for example using the user interface of FIG. 9. At Block 420, a user can select on-demand broadband, for example, by selecting any of the choices shown at the right side of FIG. 9. These choices will be described in detail below. At Block 430, an on-demand broadband connection is then provided, based on the user selection. At Block 240, a sponsored proactive search is provided. For example, FIG. 10 illustrates a user viewing a Website as a result of a search. FIG. 11 illustrates the provision of sponsored lines 1100 as a result of sponsored proactive searches.

Figure 12:
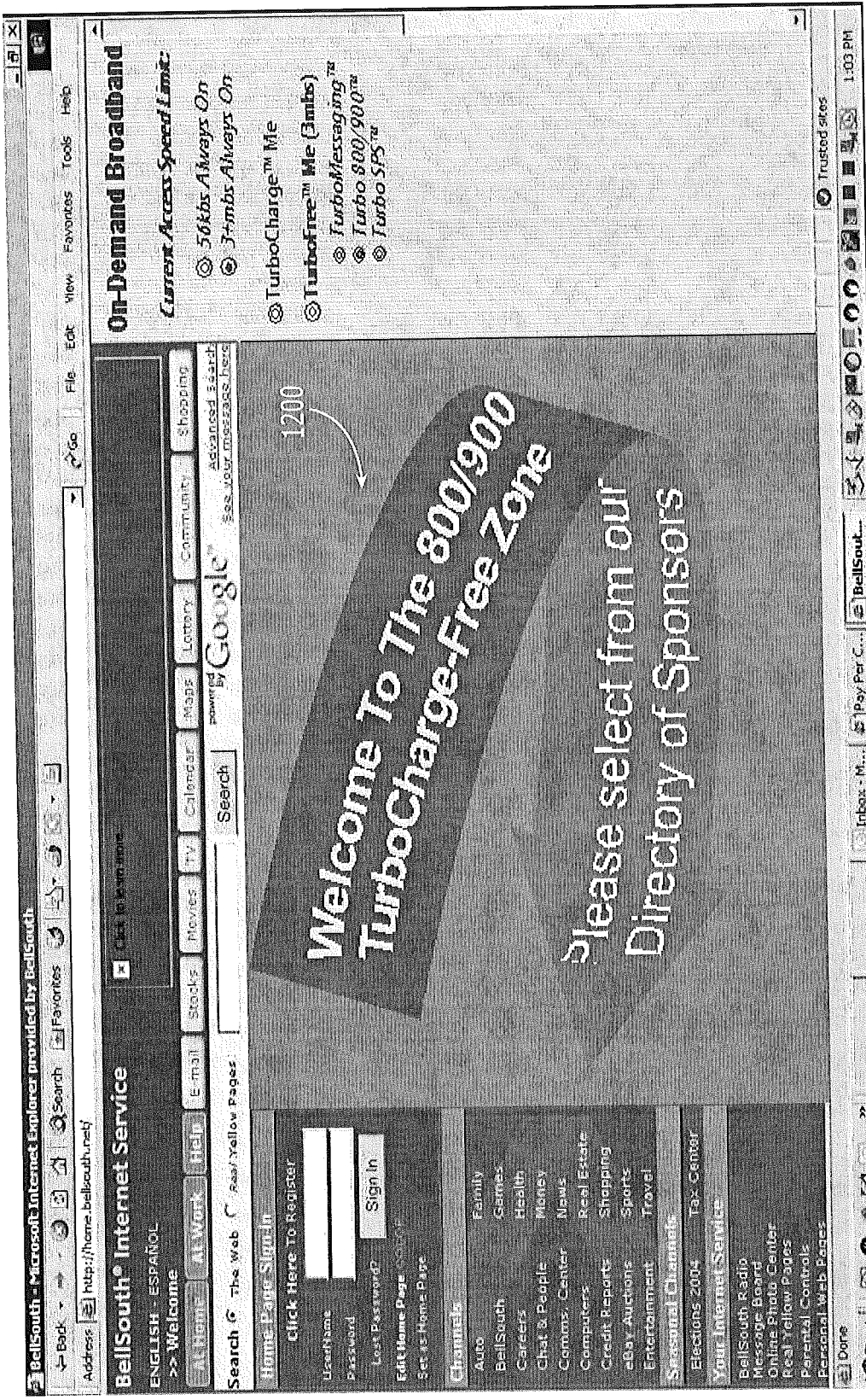

FIG. 5 illustrates other embodiments of the invention. In embodiments of FIG. 5, operations of Blocks 410, 420 and 430 are performed as were described above. Then, at Block 340, a sponsorship message or link is provided. FIG. 12 illustrates embodiments of a sponsorship message or link 1200, which indicates "Welcome to the 800/900 Turbo-Charge-Free Zone. Please select from our Directory of Sponsors". This message may be provided upon initial switch to the on-demand broadband connection and/or at various other times while providing the on-demand broadband connection.

Figure 6:
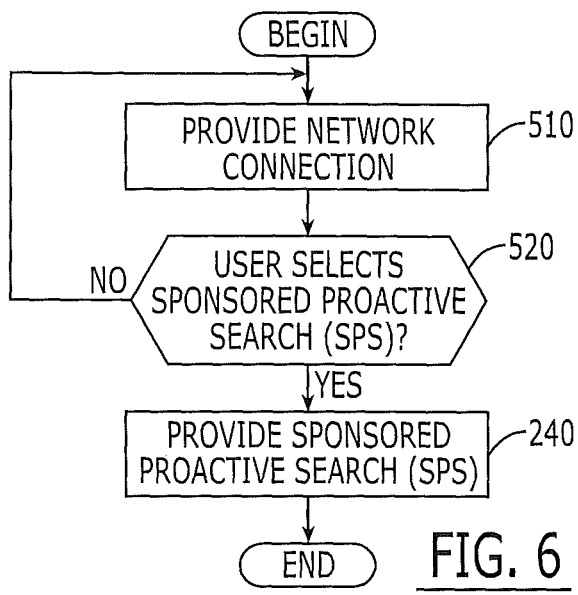

FIG. 6 illustrates other embodiments of the present invention, wherein the sponsored proactive search as described above may provide value to the user, and may be selected by a user independent of the network connection. Thus, at Block 510, a network connection of standard or higher Quality of Service is provided. At Block 520, the user selects a sponsored proactive search. In that case, the sponsored proactive search is provided at Block 240 until deselected by the user.

Figure 7:
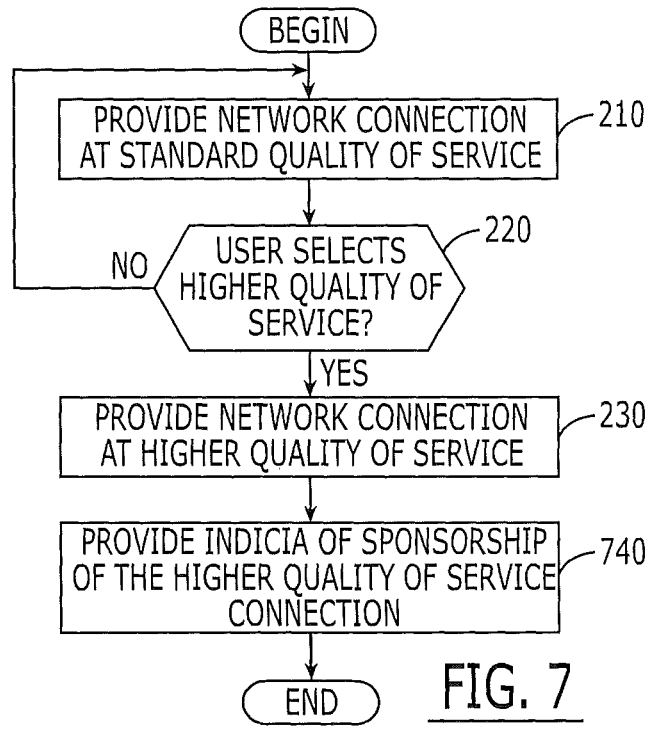

FIG. 7 provides a summary of embodiments of FIGS. 1-6. As shown in FIG. 7, operations at Blocks 210, 220 and 230 are provided. Then, at Block 740, indicia of sponsorship of the higher Quality of Service connection is provided. These indicia may be provided by the sponsored proactive search of Block 240, the sponsorship message or link of Block 340 and/or other conventional indicia of sponsorship that is used with the Internet.

In other embodiments of the present invention, the owner of a Website may also sponsor a higher Quality of Service connection, independent of user selection of a higher Quality of Service or of a sponsored proactive search. Thus, for example, the owner of a Website may encourage visits to the Website by sponsoring a higher Quality of Service network connection for visitors of the Website. In other embodiments, a higher Quality of Service network connection may be sponsored while the user is viewing a predetermined page of the Website. Thus, if a predetermined page of a Website is more efficiently accessed using a higher Quality of Service network connection, for example due to multimedia content at the page, the Website owner may sponsor a higher Quality of Service connection to encourage users to use the page and/or site.

Figure 8:
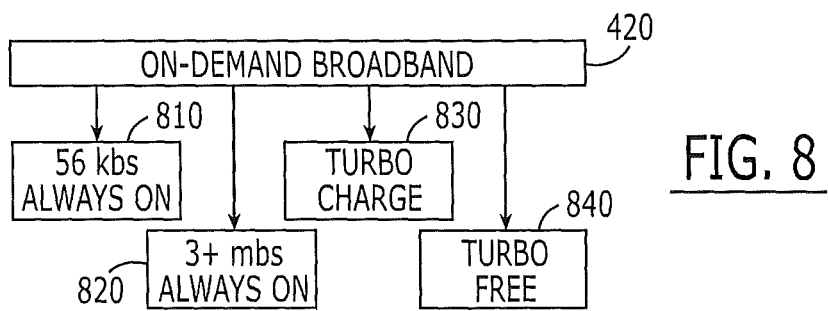

FIG. 8 illustrates various embodiments of on-demand broadband that may be selected at Block 420 according to various embodiments of the present invention. It will be understood, however, that other embodiments of on-demand broadband may be provided. In particular, as shown in FIG. 9, a standard network connection of Block 410 may be a dial-up connection (Block 810), and an on-demand broadband connection may be a "56 kbs Always On" connection. This base or free broadband condition can provide a modest, but palpable, improvement over conventional dial-up Internet access, by allowing slightly higher speed, "always on" operation, without overriding voice communications. FIG. 9 also illustrates a higher speed "3+mbs Always On" broadband connection, corresponding to Block 820 of FIG. 8, which may be available at a higher charge and/or higher level of sponsorship.

Figure 13:
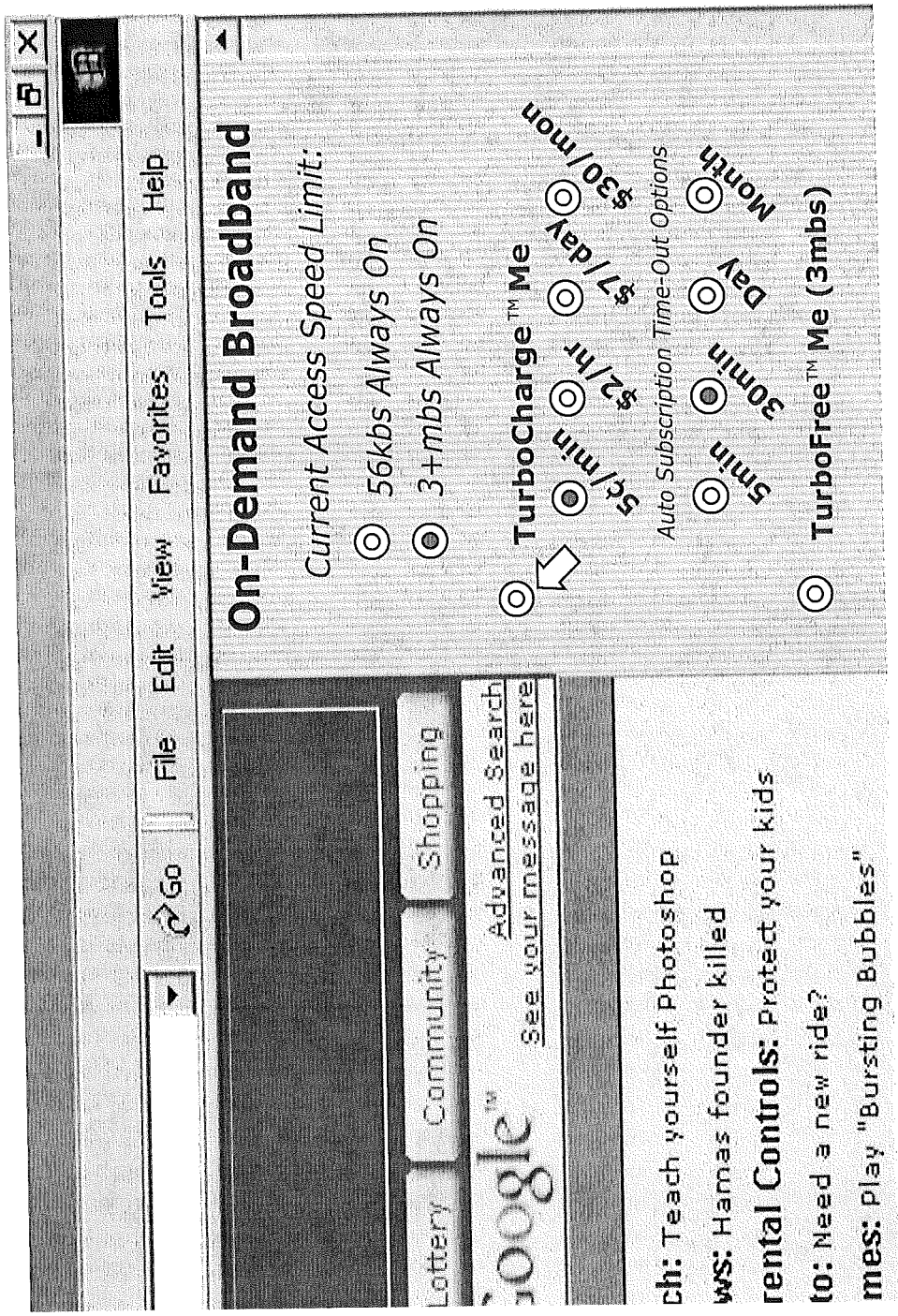
Figure 14:
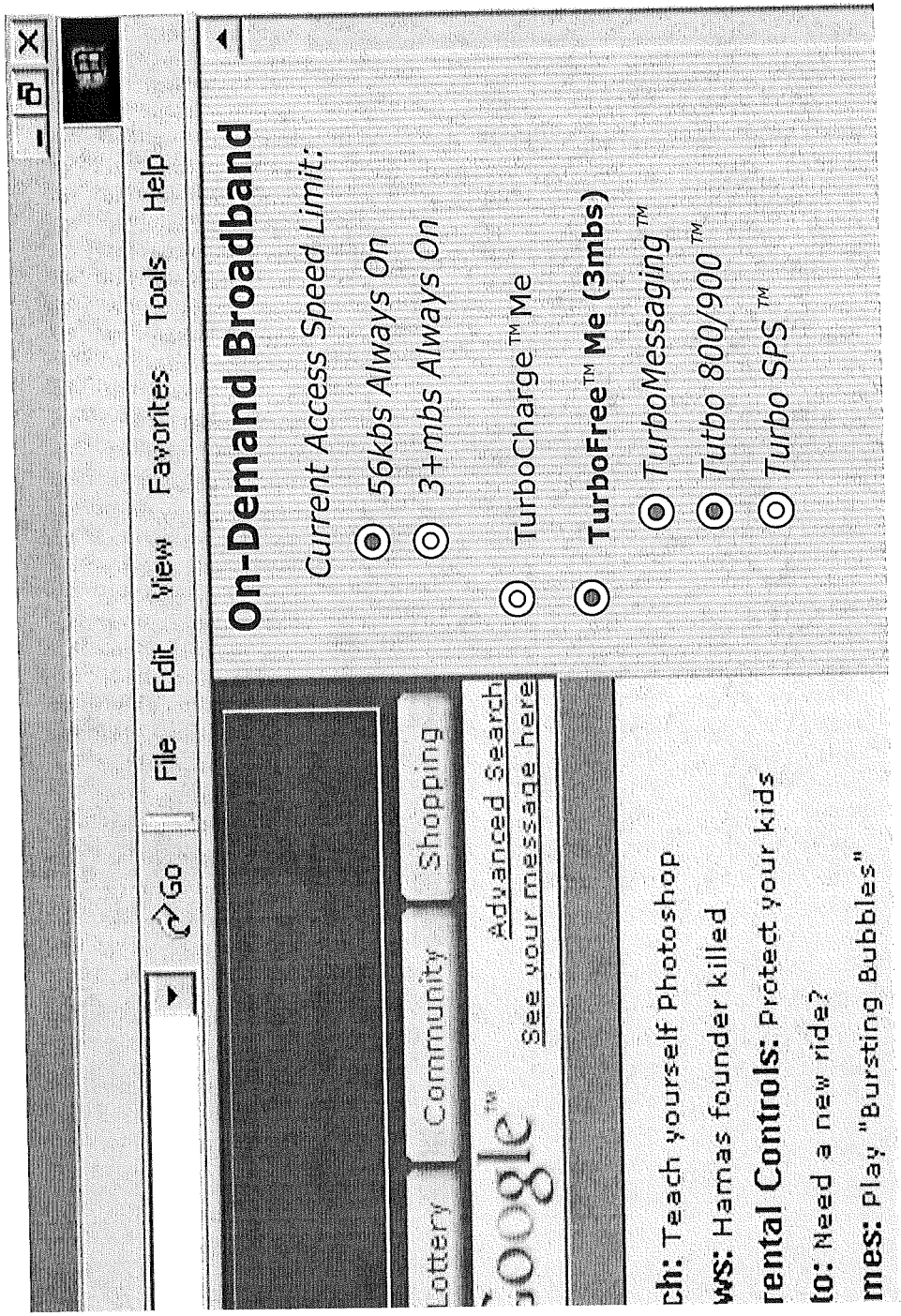

Referring again to FIG. 8, at Block 830, a "TurboCharge" operation may be provided. Examples of TurboCharge operations are shown in FIG. 13. As shown in FIG. 13, many TurboCharge options may be provided as to pricing and as to time-out options. Finally, referring to Block 840, "TurboFree" options also may be provided at no or reduced connection cost. In particular, as shown for example in FIG. 14, various options may be provided. For example, "TurboMessaging" options can provide a messaging platform for voicemail, email, instant message, chat and/or other messages. "Turbo 800/900" links also may be provided wherein the Website or link that is accessed at least partially sponsors the connection. As also shown in FIG. 14, a "Turbo SPS" option can be provided, as was described in FIG. 6, wherein sponsored proactive searching is performed during Web navigation, to underwrite the cost of the high-speed connection. Other TurboFree options may include a "TurboOffice" connection, wherein an enterprise at least partially subsidizes the high-speed connection, so that employees of the enterprise use the sponsored environment. Similarly, a "TurboGovernment" link can provide government sponsorship of the high Quality of Service connection when a government link is used. One or more of these options may be provided as an "implicit service", which may not need specific user action for activation.

Figure 15:
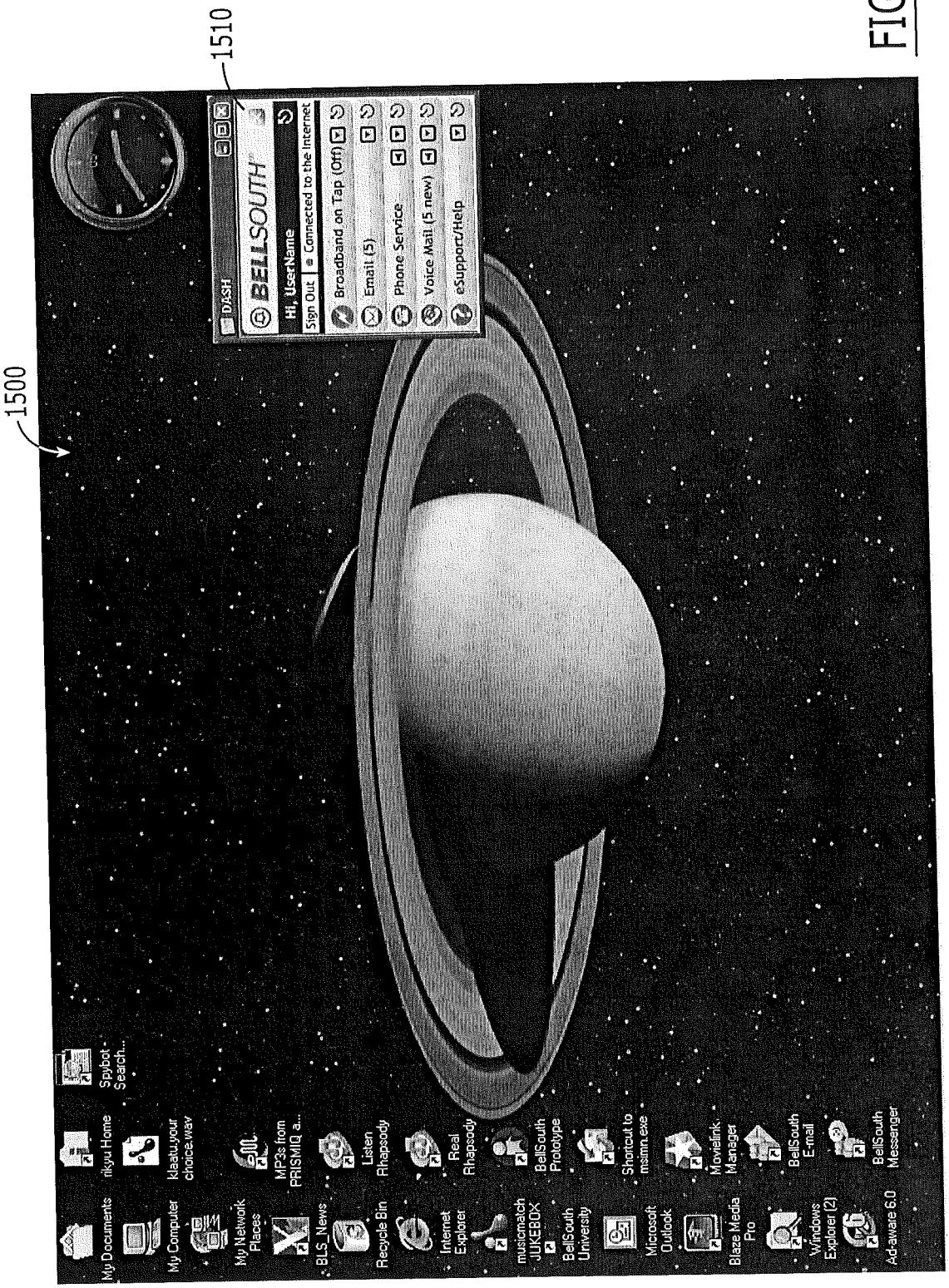
Figure 16:
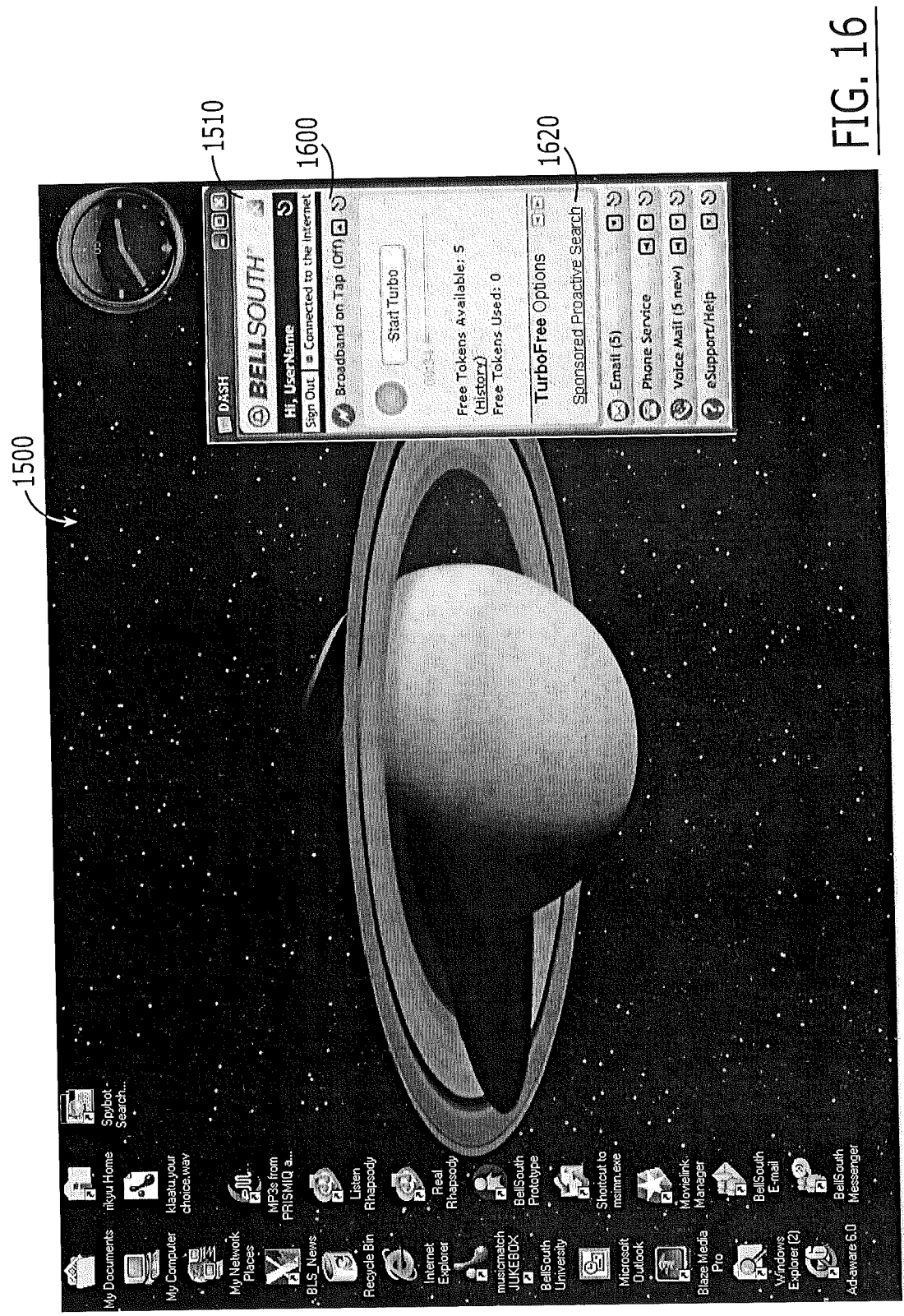
Figure 17:
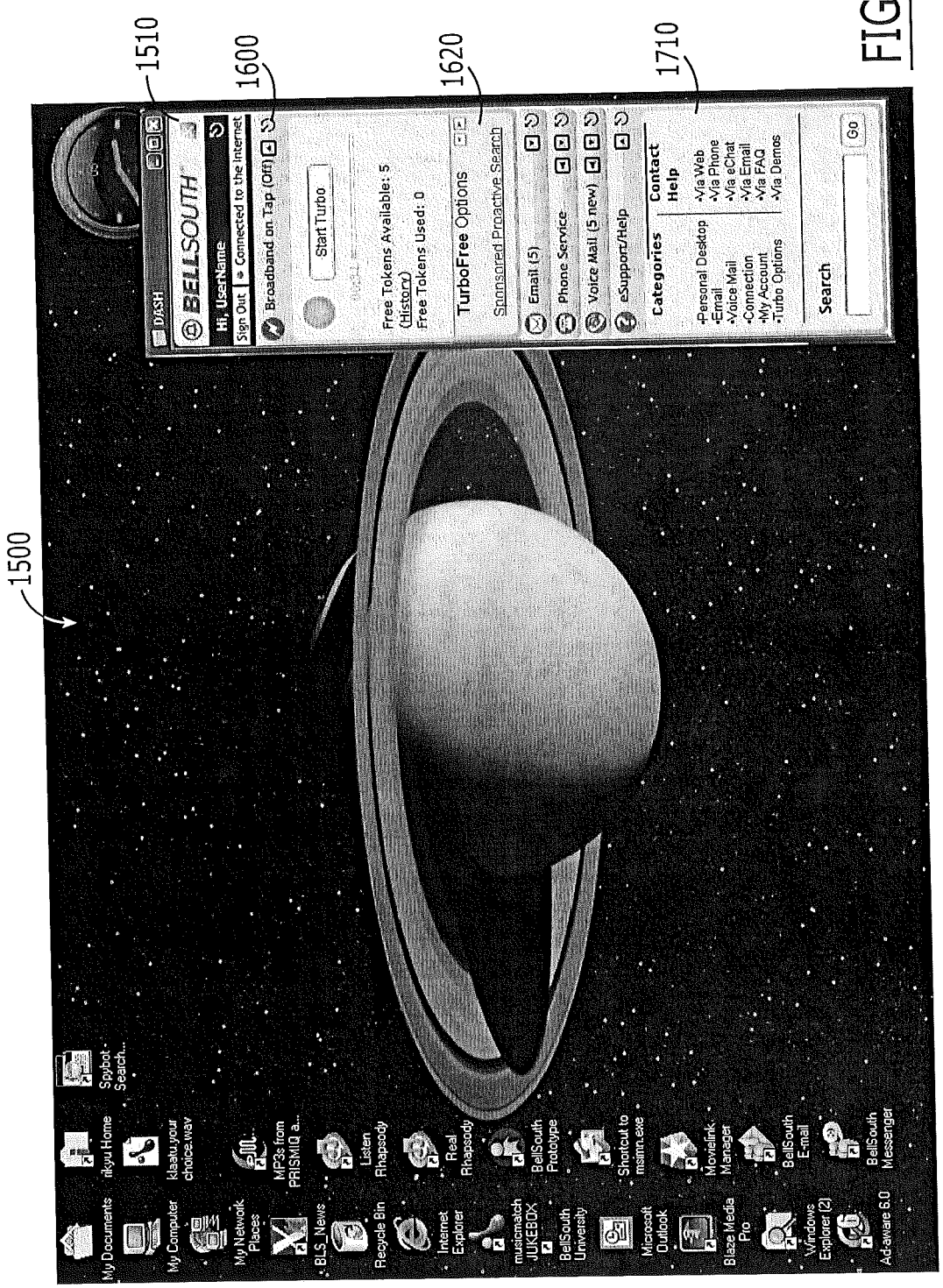

FIGS. 15-20 illustrate other user interfaces that may be used according to various embodiments of the present invention. In particular, as shown in FIG. 15, user selection of the higher quality service connection at the user device may be facilitated by providing a higher Quality of Service network connection launching interface 1510 on a desktop display 1500 or other user interface display of the user device 110. The higher Quality of Service network connection launching interface 1510 may also be referred to herein as a "personal dashboard." A similar interface may be provided regardless of whether the user device 110 is an enterprise, application, personal, pervasive or embedded computing device including a wireless radiotelephone or a Personal Digital Assistant (PDA). As shown in FIG. 15, the personal dashboard also may provide other functionality such as email phone service, voicemail and/or support/help. FIG. 17 illustrates a dropdown box 1710 that may be provided, for example, upon user selection of "support/help."

As shown in FIG. 16, upon user selection of "broadband on tap" at 1600, a dropdown box is provided that enables the user to select turbo free options including a "sponsored proactive search" at 1620, which may correspond to the user selection of the higher Quality of Service at Block 220 of FIGS. 2, 3 and 7 or the user selection of on-demand broadband at Block 420 of FIGS. 4 and 5.

Selection of the sponsored proactive search at 1620 can then provide the network connection at the higher Quality of Service which may correspond to Blocks 230 of FIGS. 2, 3 and 7 or the on-demand broadband connections 430 of FIGS. 4 and 5 and can also initiate the sponsored proactive search (SPS) of Block 240 of FIG. 2, 4 or 6 or other indicia of sponsorship such as Block 340 of FIG. 3, 5 or 7.

Figure 18:
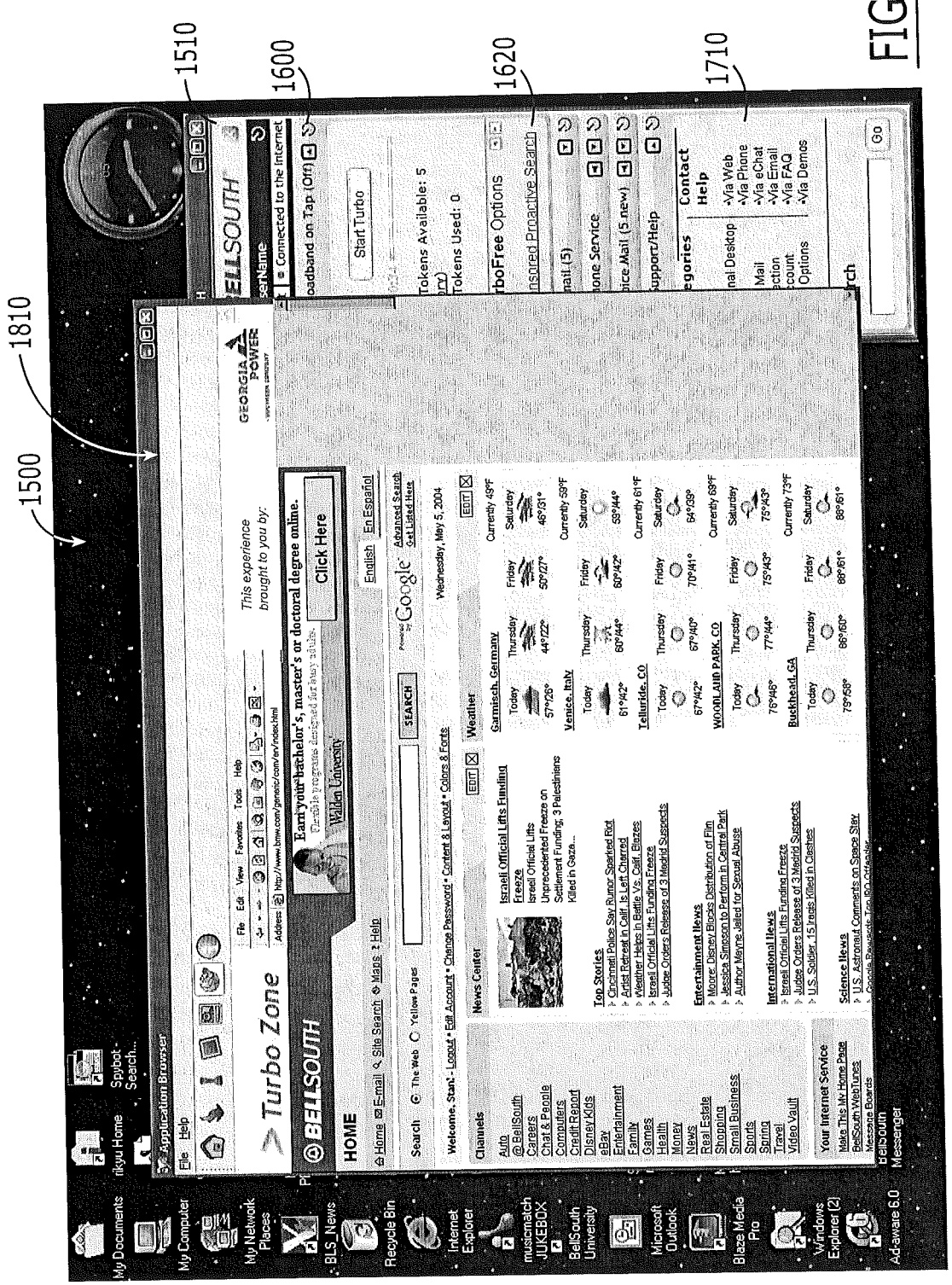
Figure 19:
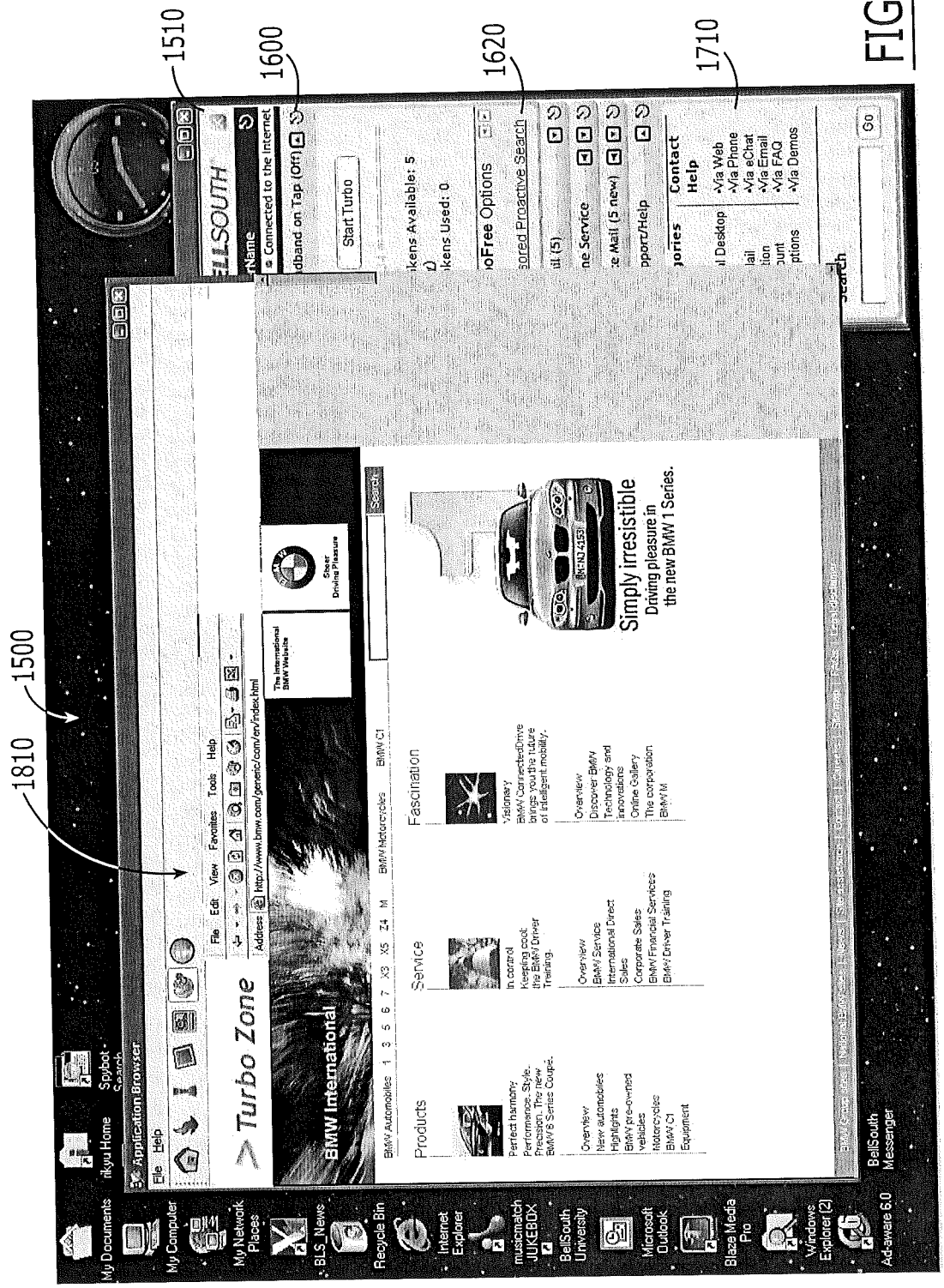
Figure 20:
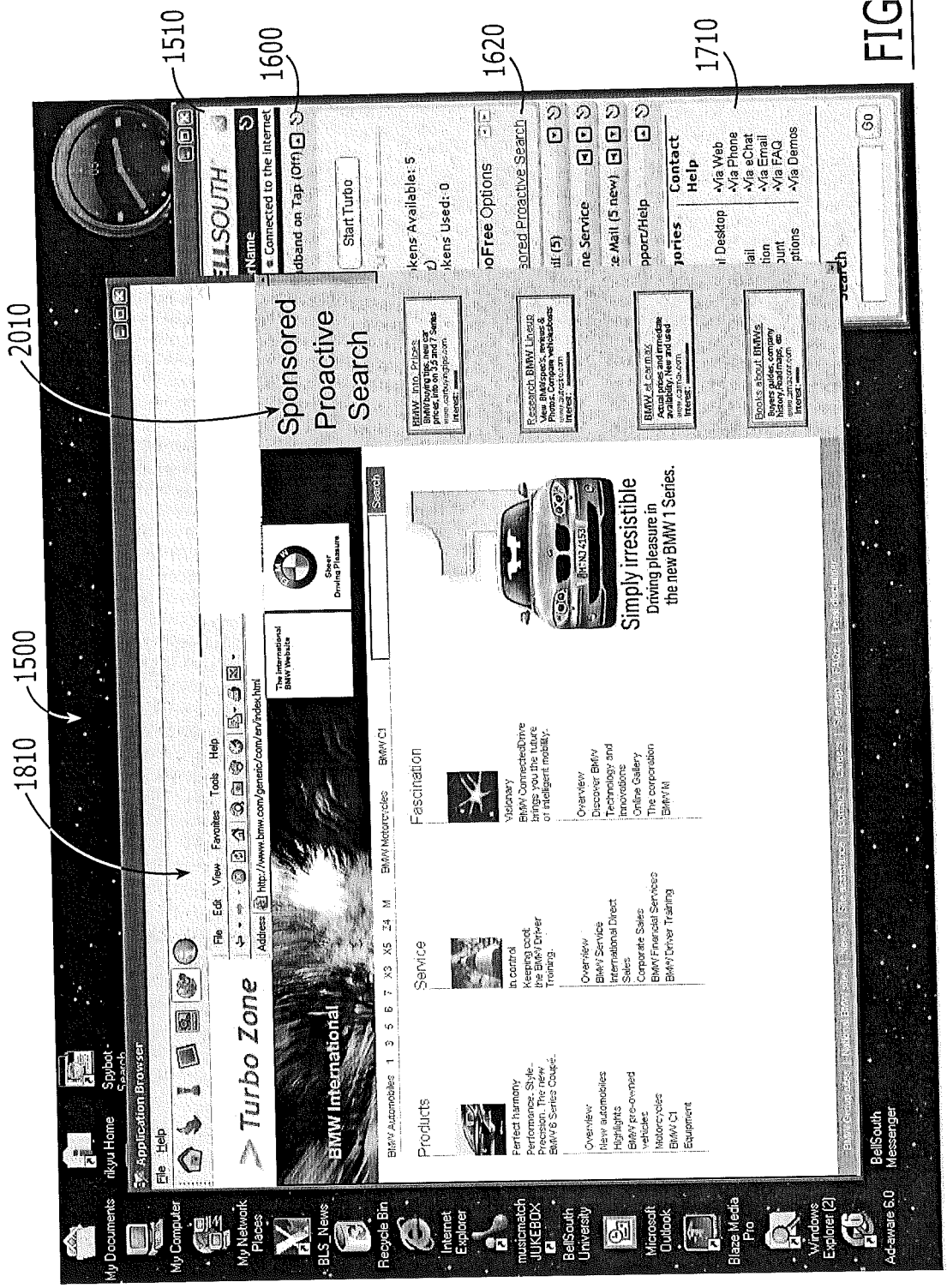

For example, as shown in FIG. 18, a persistent browser interface 1810 may be provided in response to the user selection. This persistent browser interface 1810 persists as the user device navigates the Internet to a plurality of Web pages as shown in FIG. 19. Moreover, the persistent browser interface 1810 provides one or more indicia of sponsorship 2010 shown in FIG. 20 that supersede indicia of sponsorship that are associated with the plurality of Web pages. As was already described, a series of links to the plurality of sponsored Web sites 2010 may be displayed in the persistent browser interface 1810 at the user device 110 as the user navigates the Internet to the plurality of Web pages in response to analysis of the user device navigation of the Internet and in some embodiments independent of, or in addition to, user entry of keywords in the browser interface of the user device. This analysis may take into account the Uniform Resource Locator (URL) that is being browsed, the content of the various Web pages that are being displayed and/or a history of the user's action in navigating the Internet. Other factors also may be considered.

Additional discussion of various embodiments of the present invention now will be provided. Some embodiments of the present invention may arise from recognition that business has historically been eager to underwrite the costs of communicating with its customers, employees, trading partners, etc. Indeed, some of the highest communications margins may involve ways by which prospective customers are induced to connect. Thus, product and service vendors may flock to on-demand broadband "walled garden" free-TurboCharged messages. Many users may also want to venture the Internet at large, so that paid search/directory advertising may be used to at least partially subsidize the connection. A properly executed, sponsored proactive search can provide unobtrusive value-add services. Moreover, many on-demand broadband TurboFree options described above can coexist, to create manifold revenue opportunities.

The business context within which on-demand broadband may be provided may be rooted in what customers want/need. Multiple customers may be considered. For example, consumers may want reliable voice services and increasingly inexpensive data connections to whomever/whenever they want them. Businesses may want/need better voice/data access to their remote employees, trading partners and customers. Content/application service providers (from music labels and movie studios to medical, educational institutions and/or other service providers) may want/need more pipelines to their prospective end users. A common denominator of all of these "wants" is the point-to-point common carrier broadband voice and data network.

Thus, according to some embodiments of the present invention, a network operator can sign up customers for TurboCharged (subsidized and/or free) broadband-enabled unified messaging packages, and then have vendors placing broadband 800/900 calls as well. Thus, common business/institutional needs to reach customers/employees/citizens could, in effect, cost-effectively underwrite at least some of the expense to customers for signing up and maintaining the broadband connection. At the same time, employing broadband as a turbocharger to a more broadly capable suite of integrated messaging products may also foster a new era of broadband growth.

As was described above, there can be several end user "turbo-free" options. These options can enable more secure, economical extensions of enterprise networks and may foreshadow work-at-home productivity gains, and enable public and/or government-supported broadband applications to make its subsidies explicit. Moreover, the convergence of traditional broadcast, directory and advertising markets with the emergent and rapidly growing paid search business, may point the way to fully sublimated broadband futures, as embodied, for example, by the "TurboFree" features described above. The instantiation of sponsored use might also provide a look and feel of broadcast radio or TV. For example, the end user may be unobtrusively informed that "This segment of your high-speed access is being brought to you by . . . " A more sophisticated approach can involve sponsored proactive search engines that can be presented as a value-added feature that can constantly scour the Web looking for unobtrusive text links to sites that may be of interest to the user. Moreover, the sponsored proactive search may enable recapture of the local/small-business character of much consumer-level commerce, for example using online Yellow Page directories to provide sponsored proactive links.

Accordingly, some embodiments of the present invention can combine Quality of Service control and a search engine advertising model. Conventionally, search engines may make money by selling dynamic billboard space based on search words that are entered. These sponsored links are from companies who have paid to have their link displayed when a key word is entered into a search. Some embodiments of the present invention can provide an advertising or sponsored section that can always be there, analyzing what the user is viewing. The user may tolerate or even welcome these advertisements, because higher speed access may be provided and additional sites of interest may be provided. In some embodiments, the user may at any point switch back to the standard service level.

Contextual ads thereby may be provided in a persistent browser interface in response to user selection of a higher Quality of Service, according to some embodiments of the present invention. The contextual ads may be provided based on analysis of the URLs that are viewed, the content of the Web pages, the user's history and/or other criteria. The persistent browser interface can provide sponsored links that can replace links or advertisements provided at the various Web pages that are viewed. Thus, sponsored links are displayed in the browser, not the Web page. Moreover, the request for higher Quality of Service can be launched using a desktop interface that can be consistent across various classes of user devices.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A network communication method comprising:

switching from a standard quality of service Internet connection to a higher, relative to the standard quality of service, quality of service Internet connection, in response to user selection of the higher quality of service Internet connection via a persistent browser interface, at a user device, that persists as the user device navigates the Internet to a plurality of Web pages;

displaying on the user device a series of links to a plurality of sponsored Web sites of a plurality of sponsors that subsidize the higher quality of service Internet connection in the persistent browser interface at the user device as the user device navigates the Internet to the plurality of Web pages and that supercede indicia of sponsorship that are associated with the plurality of Web pages, in response to the user selection of the higher quality of service Internet connection at the user device, the series of links being provided to the user device by a proactive search engine that is configured to search the Web independent of user key word input as the user device navigates the Internet to the plurality of Web pages; and linking the user device to one of the sponsored Web sites of one of the plurality of sponsors of the higher quality of service Internet connection in response to user selection of a corresponding link at the user device, wherein a plurality of Internet connection options are displayed in the persistent browser interface at the user device as the user device navigates the Internet to the plurality of Web pages, and wherein the plurality of Internet connection options displayed in the persistent browser interface comprises:
a first option that selects the standard quality of service Internet connection; and
a second option that selects the higher quality of service Internet connection.

2. A method according to claim 1 further comprising displaying a message at the user device that the higher quality of service Internet connection is subsidized by a sponsor.

3. A method according to claim 1 wherein the series of links to the plurality of sponsored sites are displayed on the user device in response to analysis of the user device navigation of the Internet.

4. A method according to claim 3 wherein the analysis of the user device navigation of the Internet is one of independent of and in addition to user entry of key words in a browser interface at the user device.

5. A method according to claim 1 wherein the plurality of links to the plurality of sponsored Web sites are displayed in the persistent browser interface at the user device as the user device navigates the Internet to the plurality of Web pages in response to analysis of the user device navigation of the Internet.

6. A method according to claim 1 wherein the user device comprises a user interface display having a higher quality of service Internet connection launching interface.

7. A method according to claim 1 wherein the higher quality of service connection comprises an on demand broadband Internet connection.

8. A method according to claim 1 further comprising:
providing the higher quality of service Internet connection to the user device in response to the user selection of the higher quality of service Internet connection at the user device.

9. A method according to claim 1 wherein displaying is preceded by:
providing the standard quality of service Internet connection at the user device.

10. A method according to claim 1 wherein displaying is performed by an Internet connection provider and the user device.

11. A user device comprising:
a processor;
a display coupled to the processor to display a series of links to a plurality of sponsored Web sites of a plurality of sponsors that subsidize a higher quality of service Internet connection compared to a standard quality of service Internet connection in a persistent browser interface at the user device as the user device navigates the Internet to a plurality of Web pages and that supercede indicia of sponsorship that are associated with the plurality of Web pages, in response to user selection of the higher quality of service Internet connection at the user device, the series of links being provided to the user device by a proactive search engine that is configured to search the Web independent of user key word input as the user device navigates the Internet to the plurality of Web pages, the proactive search engine being coupled to the user device over a communication network; and
a user interface display comprising a higher quality of service Internet connection launching interface that is separate from the plurality of Web pages, wherein the user selection of the higher quality of service Internet connection is performed by the higher quality of service Internet connection launching interface on the user interface display of the user device,
the display further to link to one of the sponsored Web sites of one of the plurality of sponsors of the higher quality of service Internet connection in response to user selection of a corresponding link at the user device,
wherein a plurality of Internet connection options are displayed in the persistent browser interface at the user device as the user device navigates the Internet to the plurality of Web pages, and
wherein the plurality of Internet connection options displayed in the persistent browser interface comprises:
a first option that selects the standard quality of service Internet connection; and
a second option that selects the higher quality of service Internet connection.

12. A device according to claim 11 wherein the display is further to display a message that the higher quality of service Internet connection is subsidized by a sponsor.

13. A network connection provider device comprising:
a computing device to display on selected user devices, a series of links to a plurality of sponsored Web sites of a plurality of sponsors that subsidize a higher quality of service Internet connection compared to a standard quality of service Internet connection in persistent browser interfaces at the selected user devices as the selected user devices navigate the Internet to a plurality of Web pages and that supercede indicia of sponsorship that are associated with the plurality of Web pages, in response to user selection of the higher quality of service Internet connection at the selected user devices, the series of links being provided to the selected user devices by a proactive search engine that is configured to search the Web independent of user key word input as the selected user devices navigate the Internet to the plurality of Web pages, the proactive search engine being coupled to the computing device and the selected user devices over a communication network;
the computing device further to link on the selected user devices, to the sponsored Web sites of one of the plurality of sponsors of the higher quality of service Internet connection in response to user selection of a corresponding link at the selected user devices,
wherein a plurality of Internet connection options are displayed in the persistent browser interfaces at the selected user devices as the selected user devices navigate the Internet to the plurality of Web pages, and
wherein the plurality of Internet connection options displayed in the persistent browser interfaces comprises:
a first option that selects the standard quality of service Internet connection; and
a second option that selects the higher quality of service Internet connection.

14. A device according to claim 13 wherein the computing device is further to display a message at the selected user devices that the higher quality of service Internet connection is subsidized by a sponsor.

15. A device according to claim 13 wherein the computing device is further to analyze the selected user devices' navigation of the Internet and to display the series of links to the plurality of sponsored sites of the selected user devices in response to analyzing the selected user devices' navigation of the Internet.

16. A device according to claim 13 wherein the computing device is further to analyze the selected user devices' navigation of the Internet one of independent of and in addition to user entry of key words in browser interfaces at the selected user devices.

17. A device according to claim 13 wherein the computing device is further to provide a higher quality of service Internet connection launching interface for a user interface display to the plurality of user devices, wherein the higher quality of service Internet connection launching interface is separate from the plurality of Web pages, and wherein user selection of the higher quality of service Internet connection is performed by the higher quality of service Internet connection launching interface on the user interface display of the user devices.

18. A device according to claim 13 wherein the computing device is further to selectively provide the higher quality of service Internet connection to the selected user devices in response to the user selection of the higher quality of service Internet connection at the selected user devices.

19. A method according to claim 1 wherein the plurality of Internet connection options displayed in the persistent browser interface further comprises:
a third option that selects an Internet connection that is faster than the standard quality of service Internet connection and more expensive than the higher quality of service Internet connection.

* * * * *

UNITED STATES PATENT AND TRADEMARK OFFICE
CERTIFICATE OF CORRECTION

PATENT NO. : 10,803,470 B2
APPLICATION NO. : 13/570420
DATED : October 13, 2020
INVENTOR(S) : Bulleit et al.

Page 1 of 1

It is certified that error appears in the above-identified patent and that said Letters Patent is hereby corrected as shown below:

On the Title Page (*) Notice: Please insert -- This patent is subject to a terminal disclaimer. --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*